A. L. WIDDIS.
DEVICE FOR MANUFACTURING WOOD FIBER.
APPLICATION FILED DEC. 7, 1911.
1,046,130.
Patented Dec. 3, 1912.
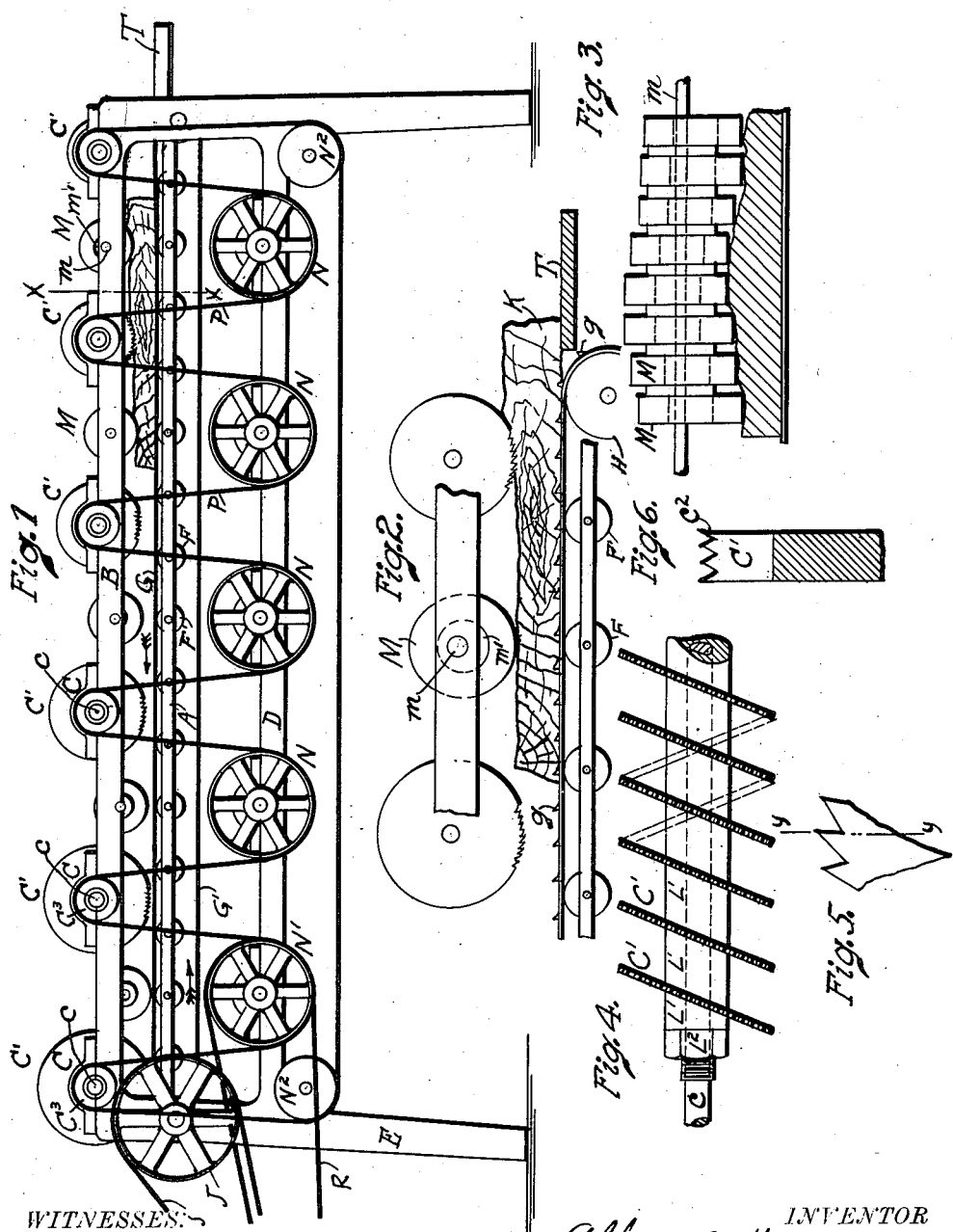
WITNESSES:
Paul A. R. Kroesing
Virginia C. Sferatt
INVENTOR
Albert L. Widdis
by Ralzemond A. Parker
Attorneys.

UNITED STATES PATENT OFFICE.

ALBERT L. WIDDIS, OF DETROIT, MICHIGAN.

DEVICE FOR MANUFACTURING WOOD FIBER.

1,046,130.  Specification of Letters Patent.  Patented Dec. 3, 1912.

Application filed December 7, 1911. Serial No. 664,454.

*To all whom it may concern:*

Be it known that I, ALBERT L. WIDDIS, a citizen of the United States, residing at Detroit, county of Wayne, State of Michigan, have invented a certain new and useful Improvement in Devices for Manufacturing Wood Fiber, and declare the following to be a full, clear, and exact description of the same, such as will enable others skilled in the art to which it pertains to make and use the same, reference being had to the accompanying drawings, which form a part of this specification.

My invention relates to improved devices for manufacturing wood fiber and has for its object a structure which will manufacture such wood fiber from material that has hitherto been considered waste and incapable of being utilized in that manner, such as slabs, a waste product in the manufacture of lumber and it consists in the construction, arrangements and combinations hereinafter described and pointed out in the specification and claims.

In the accompanying drawings:—Figure 1, is a side elevation of the machine which illustrates its general structure and the means of driving the same. Fig. 2, is an enlarged detail of Fig. 1 to more fully illustrate the principle. Fig. 3, is a sectional view on the line $x$—$x$ of Fig. 1, of the pressure rollers. Fig. 4, illustrates the manner of holding the shredding saws upon their arbors as well as the arrangement of the saws. The saws themselves being made thinner than they would proportionately be in use in the machine, for the purpose of illustrating the principle. Fig. 5, is a vertical view of a portion of the edge of one of the shredding saws. Fig. 6, is a sectional view on the line $y$—$y$ of Fig. 5, but enlarged.

In the drawings similar letters refer to similar parts.

In the drawings, A represents the frame work and bed of the machine, B, a superimposed portion of the frame carrying bearings C, C; D, is a lower portion of the frame work, the whole being supported upon legs E, E.

While I have shown only an elevation of the side of the machine, it will be understood that transversely the machine is of an appropriate width as will be described hereinafter in reference to Figs. 3 and 4, and inasmuch as they illustrate the principle, it is not deemed necessary to show a vertical cross section or an end view thereof.

The frame A preferably carries a series of rollers F, F, revolving on fixed axes and of any appropriate length, these rollers are exactly alike and in themselves have no novelty. They support a traveling belt G of any appropriate flexible material but with sufficient rigidity to have thereon short but sharp spurs $g$, $g$ (see Fig. 2). This belt travels over a driving roller H upon the shaft of which is fixed a pulley J which may be driven by a belt $j$ from any convenient source of power. The belt G is of appropriate proportionate width to that of the machine suitable to carry thereon a slab K (or a series of slabs) and force it to the saws or shredders hereinafter described by means of the points of spurs $g$, $g$, catching in the under side of the slab to be operated upon as the spurred belt G travels in the direction of the arrows. The belt G passes over an idler (not shown) at the opposite end of the machine and being endless, of course returns to the pulley H which compels it to travel. It is obvious that the belt G may be supported on ways instead of rollers as shown.

Upon the upper part of the machine or the frame B, in appropriate bearings there are journaled arbors $c$, $c$, (see Fig. 4) at C, C Fig. 1. Upon each of these arbors there is mounted in oblique parallel planes a series of circular toothed shredders as illustrated in Fig. 4. These shredders are constructed with the saw teeth in the manner as shown substantially in Fig. 5, the terminals of the teeth each being notched as shown in Figs. 6 at $c^2$. The shredders are held in their oblique planes to the axial line of the arbors $c$, $c$ and substantially parallel to each other, as shown in Fig. 4. Between each shredder is an obliquely formed washer $L^1$, but bored through so as to take the arbor $c$. Between these oblique washers are held the shredders $C^1$, $C^1$. The end washer $L^1$ is cut obliquely on one side or end and in a vertical plane to the arbor at the other end and when the whole are assembled, they are drawn together by a jam nut $L^2$ which is threaded upon the arbor, as shown in Fig. 4. As each end is alike, it is unnecessary to further illustrate or describe this mode of assemblage for the shredders upon the arbor.

It is obvious that the circular saws or shoulders being compelled to rotate rapidly with the arbor, their edges must traverse transversely at a distance equal to double the obliquity and as they are caused to rotate by the gearing at quite a high rate of speed, which speed is comparable with that of circular saws, and as their peripheral speed is very much greater than the horizontal speed of the slab K, they rapidly traverse it from side to side within their limits of movement so that the pointed teeth $c^2$ of the so-called saw teeth scarf the face of the slab into fiber of great fineness without tending to break the fiber by any special crosswise action as would be the case with circular or other saws cross cutting reducing the fiber to mere saw dust. As the shredder teeth are also notched as shown at $c^2$, Fig. 6, they prevent cutting the wood into shavings as would be the case without such notches.

It is obvious that thin saws may be used without notching the teeth but by using notched teeth, I am enabled to make the plate of the shredders thicker than otherwise and thus stiffer and stronger.

Each of the arbors $c$, mounted in the bearings C, C, carry a set of shredders as illustrated in Figs. 4, 5, and 6, each set being exactly like the others, except that as the one set cuts the slab down, the next set must be either larger or dropped lower in the bearings in order to reduce another thickness of the moving slab to fiber and so on until all of the available portion of the slab is reduced to a fiber, it being obvious that by putting the upper frame B on an incline, the saws or shredders of a similar diameter could be used to effectuate this result, but I prefer to use sets or gangs of shredders of different diameters, gradually increasing in diameter in proportion to the amount that the preceding shredder cuts down into the slab, or they may be adjusted by journaling the arbors in adjustable bearings as usual in planers and the like. Otherwise, as stated, the shredders are exactly alike and are arranged upon their respective arbors as shown in Fig. 4.

It is obvious that the degree of obliquity and the number of them in a set or gang can be varied without departing in any wise from my invention. I have found that about the best thickness for these shredders or shredding saws is about a quarter of an inch, but it is obvious that they might be made somewhat thicker or thinner without departing from my invention.

In order to hold the block down, I have devised a series of heavy rollers M, M, which operate upon fixed arbors in the manner illustrated especially in Fig. 2, these rollers M, M are located intermediately between the series of shredders as shown in Fig. 1, and run loosely upon the arbors $m$, by reason of the very large opening or bearing $m^1$ in the rollers M (see also Fig. 3). It is well known that slabs especially, are very irregular on the bark side and therefore a single fixed roller would be unable to accommodate itself to those irregularities. By using a series of loose rollers upon a fixed arbor and having in the rollers very large journals as compared with the arbor they can rise and fall to suit the irregularities of the slab or slabs on which they impinge and this is indicated in Fig. 3. It is obvious that the number of these is of little importance and not a part of the essence of my invention, so long as there is sufficient multiplicity thereof to accomplish the object desired.

The shredders or shredder saws $C^1$, $C^1$, being fixedly mounted upon their respective arbors $c$, $c$, are driven by pulleys $c^3$ fixed upon the ends of these arbors and outside of the journals upon the frame B. Under the lower side of the frame B are mounted a series of idler pulleys N, N, and one driving pulley $N^1$. Two return idler pulleys are also mounted, one at each end of the frame B, which pulleys are marked $N^2$, $N^2$.

An endless belt P traverses the pulleys $c^3$, $c^3$, the idlers N, N, and the driving pulley $N^1$ and the return idlers $N^2$, $N^2$, as shown in Fig. 1. If desired, the opposite side of the machine might have an exactly similar construction and means for driving to insure the absence of slipping. The driving pulley $N^1$ is driven by a belt R from any source of power and at the requisite speed and in a manner familiar with all millwrights, it being obvious that the driving pulley $N^1$ need not necessarily be in the same plane as the driven pulley which is driven by the belt R and that all such arrangements are simply ones of convenience and within the skill of any competent millwright. About these details in themselves, there is nothing new or novel and therefore they need not be particularly described. An entering table T is provided at the feeding end of the machine, see Fig. 1.

The operation of this machine is as follows:—A slab, say K, is placed upon the table T and drawn into the machine and into contact with the sets of shredders which it meets by the concurrent action of the traveling conveyer or belt G and the sectional rollers with sufficient force to continue it throughout the extent of the machine. The first set of shredders takes off the upper surface to a depth of about one-eighth of an inch, the next set about one-eighth of an inch more and so on until by the last set, the slab is cut down to a thickness only sufficient to permit it to be propelled and pass out of the machine without breaking up. In this manner, slabs with the bark removed may be shredded up into thin fiber, the teeth of the shredders acting in the direction of the grain of the wood, leaving the fiber comparatively long and not broken up as it is in many cases where the fiber is ground off and where the wood is otherwise pulverized, as it were, in order to break it up into wooden fiber. It is obvious that the shredders revolve against the movement of the block.

Having thus described my invention, what I desire to claim is:—

1. A machine for separating wood fiber, a shredder, having in combination, an arbor and a plurality of comparatively thick circular saws or disks obliquely set thereon, each disk being provided with a plurality of teeth and each tooth being notched for the purpose of shredding the wood, substantially as described.

2. A machine for separating wood fiber, a shredder, having in combination, an arbor and a plurality of teeth arranged thereabout so as to strike the wood or slab being fed to the machine, at all and different points along the width of the wood or slab, each of said teeth being notched for the purpose of shredding the wood or slab, substantially as described.

3. A machine for separating wood fiber, having in combination, a feeding belt, rollers arranged along the length of the feed belt and thereunder, a plurality of shredders having their peripheries arranged in gradually closer relation to the belt, as they are positioned from the feeding end of the belt, arbors, one located between each pair of shredders, heavy rollers mounted on each arbor and arranged to rise and fall with the irregularities of the wood or slab being fed, the said rollers under the feeding belt being arranged to support the heavy rolls which rest upon the upper side of the slab or wood, substantially as described.

In testimony whereof, I sign this specification in the presence of two witnesses.

ALBERT L. WIDDIS.

Witnesses:
LOTTA LEE BRAY,
VIRGINIA C. SPRATT.